Dec. 23, 1930. P. J. SHRUM 1,785,985
PROTECTOR
Filed Jan. 20, 1928
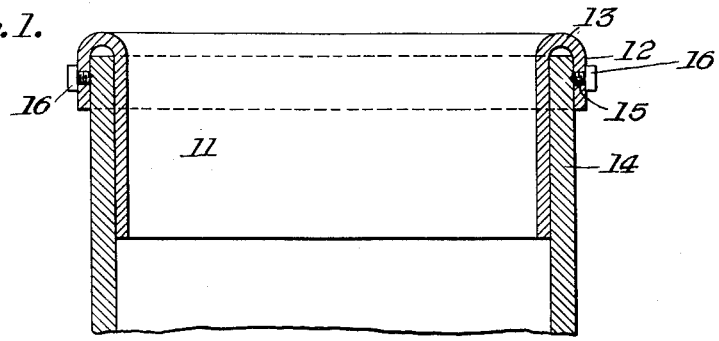
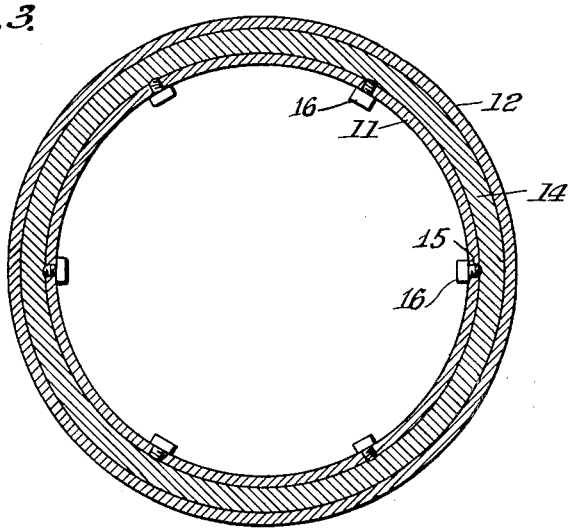
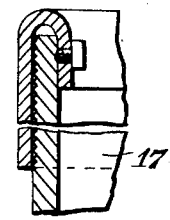
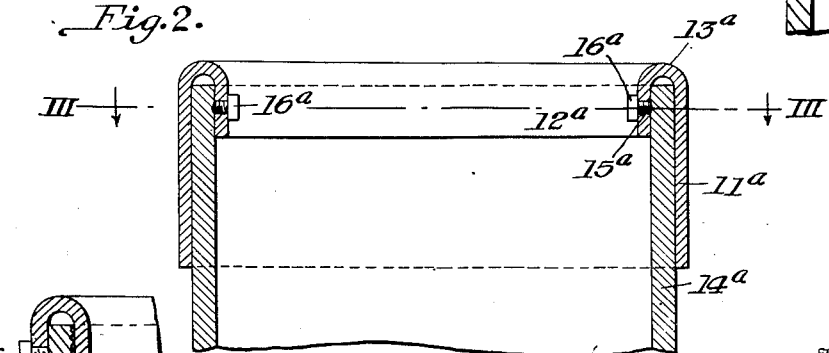
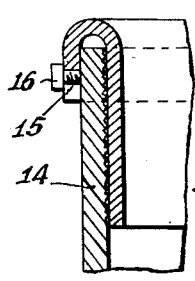
Inventor
Peter J. Shrum
By Grun & McCallister
His Attorneys Patented Dec. 23, 1930

1,785,985

UNITED STATES PATENT OFFICE

PETER J. SHRUM, OF MONACA HEIGHTS, PENNSYLVANIA, ASSIGNOR TO PITTSBURGH SCREW AND BOLT CORPORATION, A CORPORATION OF PENNSYLVANIA

PROTECTOR

Application filed January 20, 1928. Serial No. 248,129.

This invention relates to protectors and more particularly to protectors for plain or threaded ends of pipes and the like.

Many types of protectors for protecting plain and threaded ends of pipes have heretofore been provided, but such protectors are more or less complicated and elaborately constructed to accomplish the simple purpose for which they are employed.

An object of this invention is to provide a protector that shall be very simple in structure and less expensive to manufacture than protectors heretofore provided.

Another object of this invention is to provide a protector so constructed that it shall be adaptable for protecting plain or threaded ends of pipes and the like.

Another object of this invention is to provide a protector having means for fastening to the external portion of a pipe having internal threads.

Another object of this invention is to provide a protector having means for fastening such protector to the internal surface of a pipe or the like when it is desired to protect the external surface thereof and vice versa.

Other objects lie in the novel construction and combination of parts as will be made apparent throughout the further description of the device illustrated in the accompanying drawings and set forth in the appended claims.

In the drawings:

Fig. 1 is a sectional view of one form of protector according to the present invention;

Fig. 2 is a view similar to Figure 1 of a modified form of the invention;

Fig. 3 is a section on line III—III of Figure 2;

Fig. 4 is a fragmentary sectional view of a modification similar to Figure 2; and Fig. 5 is a view similar to Figure 4 but along the lines of Figure 1.

The present invention comprises in general, a protector formed from a section of pipe having one of its ends bent to form a reentrant portion and thereby forming a channel for receiving the end of a pipe or the like to be protected and a plurality of threaded means extending through the reentrant portion for engaging the pipe and clamping the protector in rigid fixed relation thereto.

The drawing shows a protector embodying the present invention adapted for use with a pipe having a plain or externally threaded end. The protector comprises a main body portion 11 having a reentrant portion 12 connected by a curved wall 13. The main body portion 11 is employed to protect the external surface of a pipe 14 adjacent its end. This external surface may be either plain or threaded.

The reentrant portion 12 is provided with a plurality of threaded openings 15 each adapted to receive screws 16 which are of sufficient length to engage the internal surface of the pipe 14 and it can readily be seen that the protector may be clamped in rigid fixed relation to the end of the pipe by the screws 16.

Figure 3 which is a sectional view taken along the line III—III of Figure 2, illustrates the protector employing six screws but it is not intended to limit this invention to any particular number of screws employed for maintaining the protector on the pipe end, as I have found for certain applications that two screws are sufficient to clamp the protector in rigid fixed relation to the pipe.

Figure 2 illustrates a somewhat different embodiment of the present invention and is adapted for use with the externally plain or threaded ends of pipes or the like. This embodiment differs from that shown in Figure 1 in that the internal diameter of the main body portion 11a is substantially the same as the external diameter of the pipe to be protected and that the re-entrant portion 12a is positioned inwardly instead of outwardly, the re-entrant portion 12a being connected to the main body portion 11a by a curved wall 13a. The re-entrant portion 12a is provided with threaded openings 15a having threaded studs 16a disposed therein for engaging the internal surface of the pipe 14a.

In Fig. 4 of the drawings, the protector embodying the present invention is shown as applied to a pipe or cylinder 17 which is provided with external screw threads.

The embodiments of the invention as shown in Figures 1 and 2 and the modifications thereof as shown in Figures 4 and 5 illustrate that the protector may be utilized on pipes or cylinders whether or not the ends of the pipes or cylinders are provided with screw threads. Figure 5, for example, shows how pipe 14 can be internally threaded and yet properly protected similarly to Figure 1.

It can be seen from the above, that the threaded means associated with the re-entrant portions contacts with the end of the pipe on the opposite side forming the side containing the threads to be protected. The present protector is simple, relatively cheap and rugged, and may be readily positioned on the end of a pipe or the like to be protected.

While I have illustrated but certain embodiments of this invention, it will be apparent to those skilled in the art, that certain changes, modifications, substitutions, additions and omissions may be made in the invention without departing from the spirit and scope of the appended claims.

What I claim as new and desire to secure by Letters Patent is:

1. A thread protector comprising a cylindrical member adapted to surround a pipe to be protected, an uninterrupted integral cylindrical member adapted to lie within said pipe, a curved wall joining said inner and outer members and threaded means extending through the inner member for engaging the inner surface of said pipe.

2. A thread protector comprising a cylindrical member having a smooth inner surface adapted to surround a threaded pipe, an uninterrupted cylindrical member adapted to lie within said pipe, a curved wall joining said inner and outer members, and threaded means extending through said inner member for engaging the inner surface of said pipe, said members being concentrically arranged whereby a pipe receiving channel is formed therebetween.

3. A pipe protector comprising an inner cylindrical member adapted to lie within said pipe, an outer cylindrical member adapted to surround said pipe, both of said members being integral and uninterrupted, a curved wall joining the inner and outer members and threaded means extending through said outer member for engaging the outer surface of said pipe.

4. A thread protector comprising a cylindrical body adapted to lie within a pipe and to protect threads on the inner surface thereof, a cylindrical member surrounding the said pipe, both of said members being integral and uninterrupted, a curved wall joining the inner and outer members and threaded means extending through said outer member for engaging the exterior surface of said pipe to secure said protector in place thereon.

5. A thread protector for a pipe having internal threads comprising a cylindrical member adapted to lie within said pipe and to cover the threads thereon, a cylindrical member surrounding the said pipe, both cylindrical members being integral and uninterrupted, a curved wall joining the said inner and outer cylindrical members, and threaded means extending through said outer member for engaging the outer surface of said pipe to secure said protector in place, said cylindrical members being concentrically arranged whereby a pipe receiving channel is formed therebetween.

6. A thread protector comprising a cylindrical member adapted to surround a pipe to be protected, an uninterrupted integral cylindrical member adapted to lie within said pipe, a curved wall joining said inner and outer members and threaded means extending through one of said members for engaging the pipe.

7. A thread protector comprising a cylindrical member having a smooth inner surface adapted to surround a threaded pipe, an uninterrupted integral cylindrical member adapted to lie within said pipe, a curved wall joining said inner and outer members, and threaded means extending through one of said members for engaging the pipe, said members being concentrically arranged whereby a pipe receiving channel is formed therebetween.

In testimony whereof, I have hereunto subscribed my name this 31st day of December, 1927.

PETER J. SHRUM.